No. 666,161.  
E. THOMSON.  
ELECTRIC METAL WORKING APPARATUS.  
(Application filed July 3, 1899.)  
(No Model.)  
Patented Jan. 15, 1901.
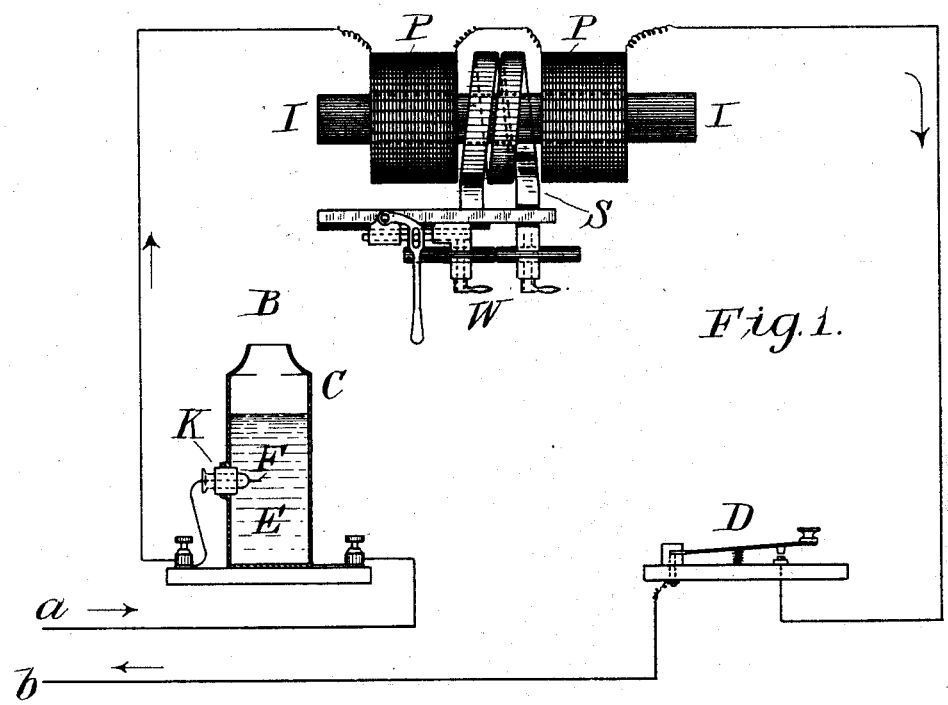
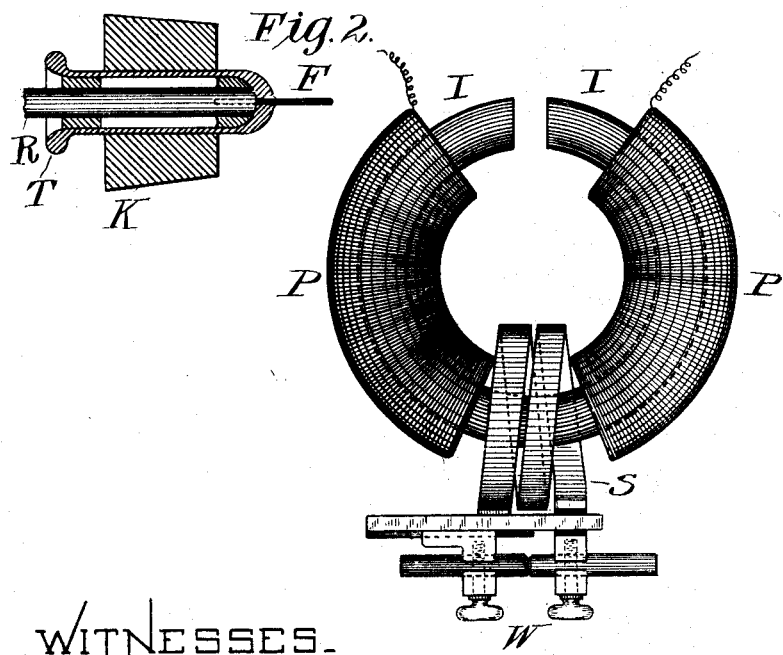
WITNESSES  
Henry C. Westendarp  
Hr. H. Capel
INVENTOR  
E. Thomson  
By H. Townsend  
Atty

UNITED STATES PATENT OFFICE.

ELIHU THOMSON, OF SWAMPSCOTT, MASSACHUSETTS, ASSIGNOR TO THE THOMSON ELECTRIC WELDING COMPANY, OF LYNN, MASSACHUSETTS.

ELECTRIC METAL-WORKING APPARATUS.

SPECIFICATION forming part of Letters Patent No. 666,161, dated January 15, 1901.

Application filed July 3, 1899. Serial No. 722,646. (No model.)

*To all whom it may concern:*

Be it known that I, ELIHU THOMSON, a citizen of the United States, and a resident of Swampscott, in the county of Essex and State of Massachusetts, have invented a certain new and useful Electric Metal-Working Apparatus, of which the following is a specification.

My present invention relates to means for operating and controlling electric welding or other electric metal-working apparatus from a direct-current supply; and it consists of the following instrumentalities, combined and operating as hereinafter set forth: first, a transformer with an open magnetic circuit such as is provided by a straight magnetic core whose ends are free, around which core is a primary coil in close inductive relation to the heavy coarse secondary to which clamps for holding the work are attached; second, an interrupter of the Wehnelt type—that is, a metal anode of limited surface immersed in an electrolyte opposite which is a cathode of metal of more extended surface, and, third, any suitable source of direct-current supply from which current may be passed through the interrupter and primary coil of the said transformer, suitable control-switches being associated with the apparatus for putting on and cutting off the current at will.

It is to be understood that other forms of interrupter securing rapid but absolute breaks in the circuit may be employed instead of that alluded to. Whatever form of interrupter be employed, however, there should be no resistance or condenser placed in shunt around the point of interruption, as such device, while it may diminish the sparking at the contact only, does so by means of lessening the total effect and prevents the device operating to produce an absolute break when running at high speeds, such as ordinarily exist in devices of this character.

Referring to the drawings, Figure 1 is a general plan of the apparatus and the connections; Fig. 2, a detail of the anode and interrupter, and Fig. 3 a modification of Fig. 1.

It is to be understood that the primary coils and secondary coils, while shown adjacent to each other on the core, may be superposed or wound one above the other, and this is sometimes the preferable construction.

I I is an open magnetic-circuit core upon which are wound the coils P P or primary coils. The reason for using an open magnetic-circuit core is that a closed magnetic-circuit core saturates with too few ampere-turns, and it does not drop its magnetism promptly on the cessation of the exciting-current, but retains a large proportion of the magnetism. If the iron core be worked near saturation, the losses are much greater than if the core be an open core working below saturation.

Put in circuit through the interrupter B, which is shown as seated in a leaden bottle or casing C, with an opening in the side for the reception of the rubber cork K or other stopper, from which passes a porcelain or glass tube bearing a platinum point, is the anode F in an electrolyte.

The secondary coil S of the transformer is very coarse and heavy, and its terminals bear electric welding-clamps or like device for utilizing very heavy current at W, where the heating effects are produced by the electric resistance of the portion of closed secondary circuit comprising the section of metal or work indicated between the clamps, as usual in the art.

D is the switch which controls the closing and opening of the primary circuit. The course or direction of the continuous current is shown by the arrows.

The interrupter device when suitably proportioned gives very rapid interruption of the primary circuit P P, the rapidity of the interruptions being controlled in large measure by the completion of the circuit through the work at W. When the secondary circuit containing the work is open, the rate of interruption is low relatively; but when it is well closed the rate rises very considerably, the output increasing with the degree of closure of the secondary circuit S.

Fig. 2 shows the rubber cork or stopper K, through which the glass or porcelain thimble T passes, bearing on its inner end the platinum electrode F, to which is soldered or integrally united a conductor of large section, as at R, so as to conduct off any heat which may form at the platinum anode F.

In Fig. 3 the iron core of the transformer is rounded, so as to form a nearly-closed magnetic circuit, but a circuit so open as to drop its magnetism when the current is interrupted in the primary coils P P. The secondary coil is, as before, a very heavy coil of but few turns, the maximum section of material being employed. W are the working-clamps, as before.

The invention claimed is—

1. In an electric metal-working apparatus, the combination, substantially as described, of a transformer having an open magnetic-circuit core and heavy secondary connected to the work-clamps, a source of continuous current, and a rapid absolute interrupter included in the circuit of the primary and said continuous-current source, as and for the purpose set forth.

2. In an electric metal-working apparatus, the combination, substantially as described, of a transformer having an open magnetic-circuit core and heavy secondary connected to the work-clamps, a source of continuous current, and an electrolytic interrupter in the circuit of the primary and continuous current source, as and for the purpose set forth.

Signed at Lynn, in the county of Essex and State of Massachusetts, this 6th day of June, A. D. 1899.

ELIHU THOMSON.

Witnesses:
DUGALD McKILLOP,
HENRY O. WESTENDARP.